(12) United States Patent
Hanashima (10) Patent No.: US 9,097,857 B2
(45) Date of Patent: Aug. 4, 2015

(54) POLARIZING PLATE AND METHOD FOR PRODUCING POLARIZING PLATE

(75) Inventor: Naoki Hanashima, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 204 days.

(21) Appl. No.: 13/699,762

(22) PCT Filed: May 31, 2011

(86) PCT No.: PCT/JP2011/062534
§ 371 (c)(1),
(2), (4) Date: Jan. 22, 2013

(87) PCT Pub. No.: WO2011/152422
PCT Pub. Date: Dec. 8, 2011

(65) Prior Publication Data
US 2013/0128358 A1      May 23, 2013

(30) Foreign Application Priority Data

May 31, 2010   (JP) ................................. 2010-124178

(51) Int. Cl.
*G02B 5/30* (2006.01)
*B82Y 20/00* (2011.01)

(52) U.S. Cl.
CPC ............... *G02B 5/3058* (2013.01); *B82Y 20/00* (2013.01); *G02B 2207/101* (2013.01)

(58) Field of Classification Search
CPC . G02B 5/3058; G02B 2207/101; B82Y 20/00
USPC ........................................ 359/485.05, 487.03
See application file for complete search history.

(56) References Cited

U.S. PATENT DOCUMENTS

| | | | |
|---|---|---|---|
| 8,619,215 B2 * | 12/2013 | Kumai | 349/96 |
| 2008/0186576 A1 * | 8/2008 | Takada | 359/492 |
| 2009/0027773 A1 * | 1/2009 | Kawakami | 359/486 |
| 2009/0153961 A1 * | 6/2009 | Murakami et al. | 359/486 |
| 2009/0226637 A1 * | 9/2009 | Yamazaki | 427/561 |
| 2010/0188747 A1 * | 7/2010 | Amako et al. | 359/486 |
| 2010/0238385 A1 * | 9/2010 | Zhang et al. | 349/96 |

FOREIGN PATENT DOCUMENTS

| | | |
|---|---|---|
| JP | A-10-73722 | 3/1998 |
| JP | A-2003-502708 | 1/2003 |
| JP | A-2006-126464 | 5/2006 |
| JP | A-2007-52316 | 3/2007 |
| JP | A-2008-216956 | 9/2008 |
| JP | A-2009-31538 | 2/2009 |
| JP | A-2009-86127 | 4/2009 |

OTHER PUBLICATIONS

International Search Report issued in International Patent Application No. PCT/JP2011/062534 dated Jul. 12, 2011.
International Preliminary Report on Patentability issued in International Patent Application No. PCT/JP2011/062534 dated Apr. 4, 2012 (with translation).

* cited by examiner

*Primary Examiner* — Frank Font
(74) *Attorney, Agent, or Firm* — Oliff PLC (57) ABSTRACT

A polarizing plate with high reliability even under a high-temperature or high-humidity environment is provided. A substrate has a non-formation region on a circumferential edge part, the non-formation region where a grid is not formed.

20 Claims, 6 Drawing Sheets

POLARIZING PLATE AND METHOD FOR PRODUCING POLARIZING PLATE

FIELD OF THE INVENTION

This invention relates to a polarizing plate separating incident light into transmission light and reflected light according to a polarizing direction and a method of producing the polarizing plate.

The present application asserts priority rights based on JP Patent Application 2010-124178 filed in Japan on May 31, 2010. The total contents of disclosure of the patent application of the senior filing date are to be incorporated by reference into the present application.

BACKGROUND OF THE INVENTION

In recent years, in a liquid-crystal display device or the like, a polarizing film has been used as a thin polarizing plate that is obtained by absorbing an iodine compound onto a polyvinyl alcohol (PVA) film and drawing and orienting the result to express absorption linear dichroism. To ensure mechanical strength, heat resistance, and humidity resistance, both surfaces of the polarizing film are interposed between transparent films made of triacetyl cellulose (TAC) or the like, and hard coating is performed thereon to prevent flaws, attachment of fouling, and others.

Of light entering the polarizing film, light of polarizing components not passing therethrough is absorbed onto the polarizing film and is dissipated as heat to the outside of the film. For this reason, at the time of irradiation of strong light, the temperature of the film is increased by heating to disadvantageously degrade polarization properties. This is due to heat resistance of an organic material itself, and substantive improvement is difficult.

To address this problem, a polarizing plate configured only of a completely inorganic material is used. What is typical as a thin polarizing plate is a polarizing glass and a wire-grid polarizing plate. The polarizing glass is formed of metal island-shaped fine particles deposited in the glass, and is caused to express absorption linear dichroism by anisotropy of plasma resonance absorption of the fine particles. While the polarizing components not passing through are absorbed, the plate is configured of an inorganic material, and therefore has a high heat resistance.

On the other hand, the wire-grid polarizing plate has a wire grid made of fine metal wires having a period equal to or smaller than the wavelength of light formed on a front surface of a substrate (refer to Patent Document 1). In this wire-grid polarizing plate, polarizing components not passing through are reflected due to plasma oscillation of free electrons, and therefore there is a merit that incident light can be more effectively used.

Also, as a type similar to the wire grid, there is a fine-particle-type polarizing plate formed with oval metal fine particles arranged on a front surface of a substrate (refer to Patent Document 2). This uses plasma resonance absorption of fine particles and, unlike the wire-grid polarizing plate, polarizing components not passing through are absorbed. Thus, for example, to prevent a temperature increase or degradation of the liquid-crystal panel due to reflected light from the polarizing plate, this plate is used on an emission side of the liquid-crystal panel.

These polarizing plates made of an inorganic material has no problem in degradation in properties due to heat resistance as seen in an organic polarizing film, and has been used as a polarizing plate for liquid-crystal projectors irradiated with strong lamp light.

PRIOR-ART DOCUMENTS

Patent Documents

PTL 1: Japanese Unexamined Patent Application Publication (Translation of PCT Application) No. 2003-502708
PTL 2: Japanese Patent Application Laid-Open No. 2008-216956
PTL 3: Japanese Patent Application Laid-Open No. 10-073722
PTL 4: Japanese Patent Application Laid-Open No. 2006-126464

SUMMARY OF THE INVENTION

Since these inorganic polarizing plates do not contain organic material components that are decomposed at high temperatures, high heat resistance can be obtained. However, in a type such as the wire-grid polarizing plate or the fine-particle-type polarizing plate in which a polarizing film such as a wire grid or fine particles are formed on the front surface of the substrate, properties may be degraded depending on the polarizing film material due to oxidation from the front surface or the like under a high-humidity and high-temperature environment. To prevent this degradation, it is effective to coat the wire grid made of metal wires or metal fine particles with some protective film. As the protective film, one made of an organic monomolecular layer, an oxide film such as $SiO_2$ or $Al_2O_3$ or a nitride film such as SiN generally used as a barrier layer of a semiconductor device, or others can be used.

Patent Document 3 describes that reliability of the wire-grid polarizing plate is improved by coating with a monomolecular layer of a corrosion inhibitor made of alumino phosphonate equal to or smaller than 10 nm. According to this, it is described that, since the wire-grid polarizing plate has a fine structure at a nano level, if a material and forming method normally used for anticorrosion is directly applied, significant degradation in optical properties may be invited.

Patent Document 4 describes that environmental resistance of the wire-grid polarizing plate is improved by coating a surface of Al configuring a wire grid. Here, a surface thermal oxide film obtained by an Al heat treatment is used. In this method, a conductive ground Al film required for electron beam rendering can be thermally oxidized together, and this portion can be advantageously made transparent. Therefore, it is described that, advantageously, this ground film is not required to be removed by using etching, a lift-off method can be used as a patterning method, and instability of the etching process can be avoided.

As described above, in the wire-grid polarizing plate and the fine-particle polarizing plate, it is generally recognized that the protective film is coated in order to enhance environmental resistance. However, if a fine structure such as a wire grid or fine particles are present on the surface, a significant difference in the effect of improving reliability disadvantageously occurs depending on the forming method even if the same material is used as the protective film.

Since this formation of the protective film on the polarizing film is accompanied with degradation of polarization properties, it is generally desired to make the film thickness thinner. However, since the influence of a subtle defect inherent in the protective film itself is increased, making the film thinner has a limit, and the thickness is optimally determined within a range not decreasing the protecting function. For example, when a material rich in reactivity such as Ge is used as a polarizing material, an oxidation reaction may develop from a pin hole or a subtle defective part of the protective film on a cutout end face to degrade the polarization properties. In particular, when a foreign substance such as sebum is present on a defect, significant degradation may be exhibited. This alteration of the polarizing film tends to develop along the grid where the polarizing material is arranged due to the structure of the wire-grid polarizing plate and the fine-particle-type polarizing plate. Even if the defect itself is outside an effective range of the polarizing plate, the altered region may be extended with a lapse of time inside the effective range.

As this defect of the protective film, other than one such as a pin hole inherent in the film itself, one occurring in a sectional end face of the substrate is present. When a process is used in which a polarizing plate is created at one time on a large wafer for the sake of lower prices and is then finally cut into pieces, cutting into pieces such as dicing or scribing may fracture part of the protective film formed on the polarizing film. Moreover, the cut end face portion of the substrate has a high possibility of having a foreign substance or the like attached thereon at the time of handling or the like, which is a cause of promoting degradation after cutting into pieces.

Thus, an object of the present invention is to provide a polarizing plate with high reliability even under a high-temperature or high-humidity environment and a method of producing the polarizing plate.

To solve the problems described above, in a polarizing plate according to the present invention, the substrate has a non-formation region on a circumferential edge part, the non-formation region where a grid is not formed, and a protective film protecting the grid is formed on an entire surface of the grip and is formed also on the non-formation region.

Also, a method of producing a polarizing plate according to the present invention includes a step of providing, on a ground film formed an entire surface of a substrate, a resist having a pattern for forming a grid and a pattern for forming a non-formation region, in which the grid is not formed, on a circumferential edge part of the substrate, and forming the grid and the non-formation region by using the ground film, and a step of forming a protective film for protecting the grid, the protective film for protecting the grid being formed on an entire surface of the grid and being formed also on the non-formation region.

EFFECTS OF INVENTION

According to the present invention, since a region where a grid is not formed is provided on the circumferential edge part of the substrate, degradation of the polarizing film does not occur even when a fracture occurs in the protective film of the substrate circumferential edge part.

DETAILED DESCRIPTION OF THE INVENTION

Figure 1:
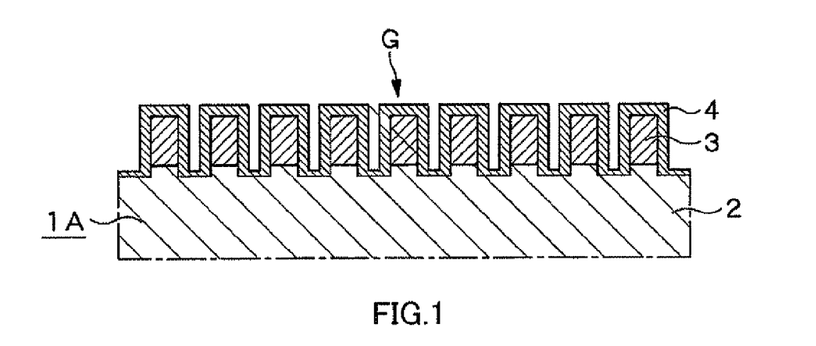
FIG. 1 is a sectional view of a wire-grid polarizing plate.
Figure 2:
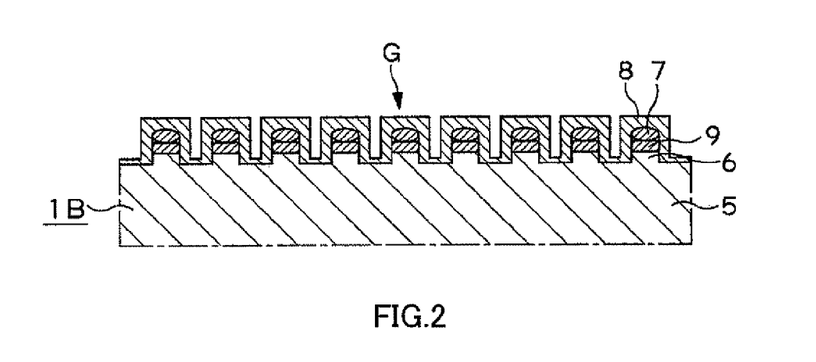
FIG. 2 is a sectional view of a fine-particle-type polarizing plate.

A polarizing plate to which the present invention is applied and its producing method are described in detail below with reference to the drawings. A polarizing plate 1 to which the present invention is applied is, for example, as depicted in FIG. 1, a wire-grid polarizing plate 1A that has a wire grid. 3 formed on a substrate 2, the wire grid made of fine metal wires with a pitch equal to or smaller than the wavelength of light, and having a protective film 4 protecting the wire grid 3 formed over the entire surface of the substrate 2 or, as depicted in FIG. 2, is a fine-particle-type polarizing plate 1B that has a grid pattern 6 formed on a substrate 5, the grid pattern having a pitch equal to or smaller than the wavelength of light, having fine particles 7 arranged on the grid pattern 6 via a metal layer 9 and, furthermore, having a protective film 8 formed over the entire surface of the substrate 5.

Figure 3:
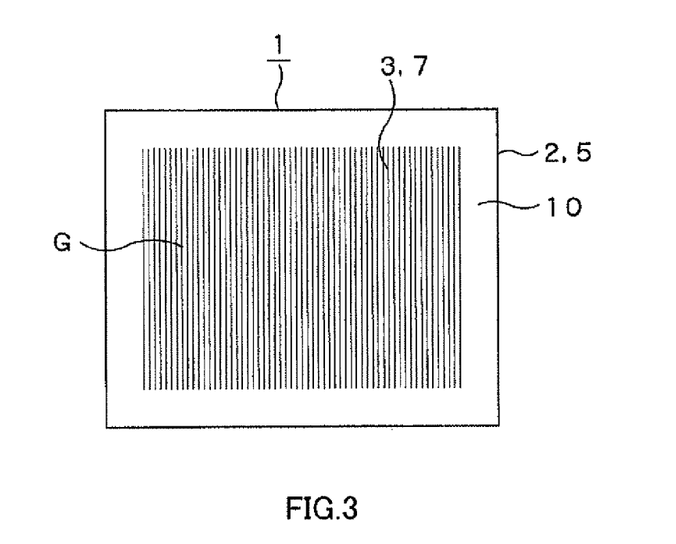
FIG. 3 is a plan view of the polarizing plate.

And, as depicted in FIG. 3, this polarizing plate 1 has a circumferential edge part of the substrate 2, 5 provided with a region where a grid G, in which a polarizing film such as the wire grid 3 or the fine particles 7 arranged on the grid pattern 6 is formed, is not formed (the region is hereinafter referred to as a "non-formation region 10"). With this, in the polarizing plate 1, even if a defect occurs in the protective film 4, 8 formed on the circumferential edge part of the substrate 2, 5 due to cutting into pieces or the like, degradation of the polarizing film developing from the circumferential edge portion of the substrate 2, 5 along the grid G can be avoided.

As the substrate 2, 5 configuring the polarizing plate 1A, 1B, anything including glass can be used as long as it is optically transparent. For a use purpose such as a liquid-crystal projector, to avoid the polarizing film from being fractured due to heat occurring by absorption, a substrate having high heat-resistance and heat-dissipating properties is often used.

For example, since a quartz substrate not only has a high thermal conductivity compared with glass but also has the same composition as quartz glass, the quartz substrate is convenient when the substrate itself is etched to enhance optical properties of the polarizing plate. Also, in the case of a sapphire substrate, since sapphire has a thermal conductivity higher than that of quartz, the sapphire substrate has excellent heat-dissipation properties. The substrate temperature can be advantageously suppressed to be lower compared with quartz even with the same cooling structure, and the temperature of an optical system itself can be advantageously suppressed.

Also, regarding the polarizing film such as the wire grid 3 or the fine particles 7 arranged on the grid pattern 6, in the case of the wire-grid polarizing plate 1A, for example, Al, AlSi, or the like can be used as a polarizing film material, but it goes without saying that the material is not restricted to these materials. On the other hand, in the case of the fine-particle-type polarizing plate 1B, Ge, Si, or the like is used, but the material is not restricted to these material, either.

The non-formation region 10 is a region where the grid G, in which the polarizing plate on the circumferential edge part of the substrate 2, 5 is formed, is not formed. In the polarizing plate 1, for example, when being cut into pieces by cutting the wafer substrate after the protective film 4, 8 is formed, a chipping region, which is a subtle missing of the substrate 2, 5, is present at the cut portion. The protective film 4, 8 is fractured in a cut region occurring due to cutting into pieces and the chipping region adjacent to this cut region.

Therefore, in the polarizing plate 1, by forming the non-formation region 10 on the circumferential edge part where the protective film 4, 8 is fractured in this manner, the wire grid 3 or the fine particles 7 arranged on the grid pattern 6 can be prevented from being exposed outside even with fracture of the protective film 4, 8, thereby preventing degradation of the polarizing film.

Figure 4A:
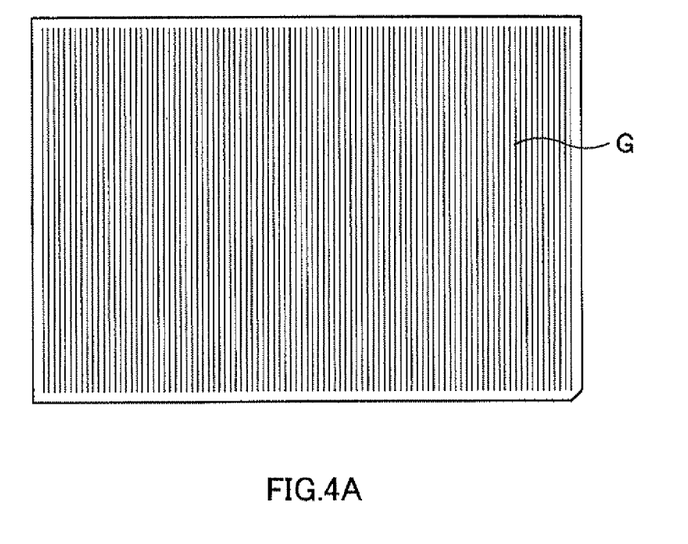
FIG. 4A is a drawing of the polarizing plate through which light is let pass.
Figure 4B:
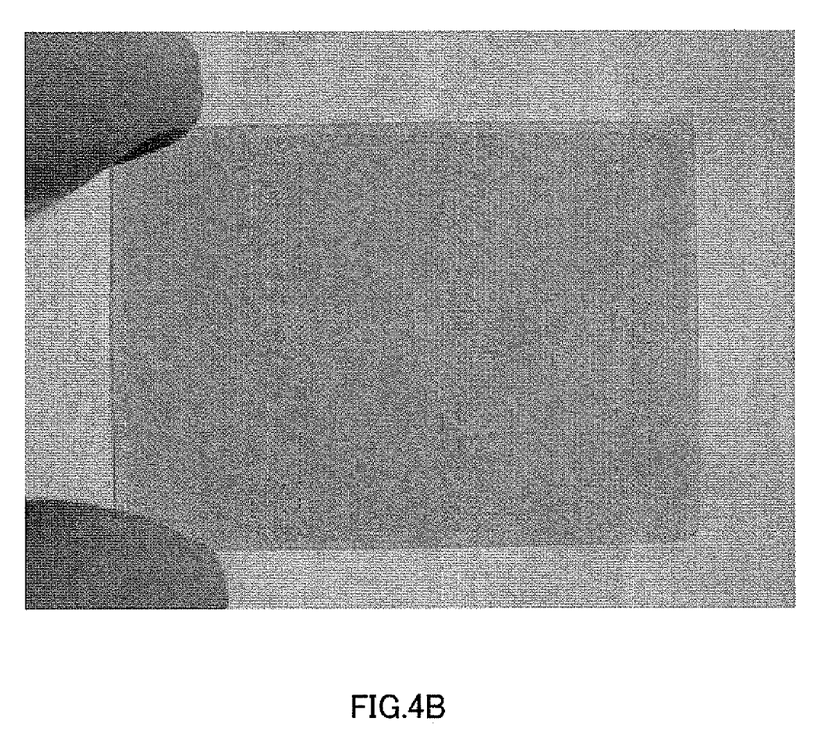
FIG. 4B is a photograph of the polarizing plate of FIG. 4A, with fingers of a photographer shown at left end.
Figure 5A:
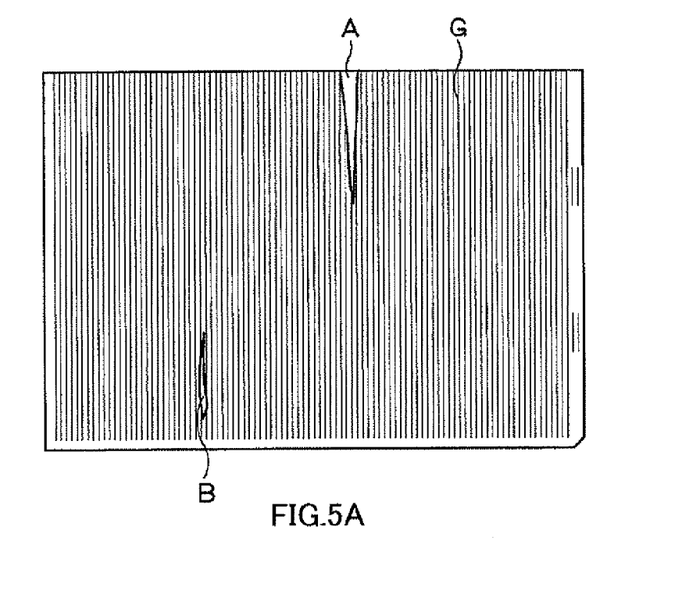
FIG. 5A is a drawing of a conventional polarizing plate through which light is let pass.
Figure 5B:
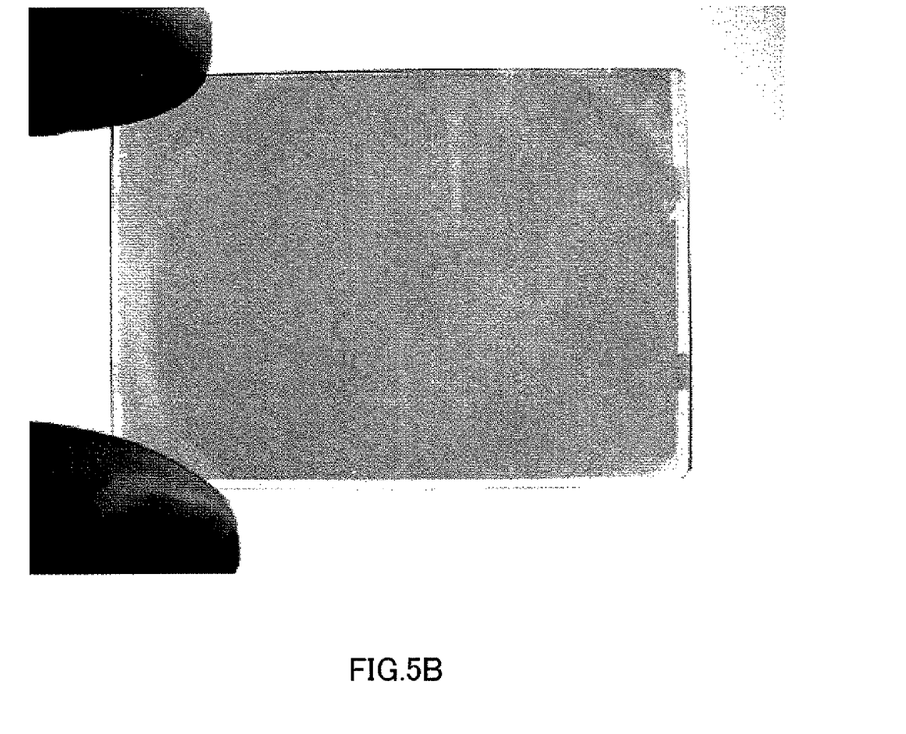
FIG. 5B is a photograph of the polarizing plate of FIG. 5A, with fingers of a photographer shown at left end and also the outline of a camera shown in an arc shape.

As depicted in FIG. 4, discoloration of the polarizing film is not observed over the entire surface of the polarizing plate 1 provided with the non-formation region 10 on the circumferential edge part, preventing degradation. On the other hand, as depicted in FIG. 5, in the polarizing plate in which the grid G is formed also on the circumferential edge part and the non-formation region 10 is not provided, it can be found that a streak A is observed with the circumferential edge part as a starting point and degradation of the polarizing film occurs. Note in FIG. 5 that a streak B was also observed with a foreign substance left on the substrate as a starting point.

Also, the non-formation region 10 has a width far larger than the pitch of the grid G from the circumferential edge part of the substrate 2, 5 toward inside, and the width is preferably equal to or larger than 0.2 mm. This is because, with this, even if chippings are present more, the possibility of degradation of the polarizing film accompanied with fracture of the protective film 4, 8 can be decreased. That is, a range where chippings can occur is a range of 0.1 mm at maximum from the cutting surface toward the inside of the substrate. Therefore, by providing the non-formation region 10 of 0.2 mm from the circumferential edge part of the substrate 2, 5 toward the inside of the substrate, the polarizing film does not receive an influence of chippings.

Note that the non-formation region 10 is formed in a range of 2 mm to 3 mm from the circumferential edge part of the substrate 2, 5 toward inside. Since a boundary of an effective region of the polarizing plate 1 that a light beam enters is often at a position 2 mm to 3 mm from the substrate end, by providing the non-formation region 10 having a width equal to or larger than 0.2 mm in a range of 2 mm to 3 mm from the circumferential edge part of the substrate 2, 5, degradation of the polarizing film accompanied by fracture of the protective film 4, 8 can be prevented without decreasing the effective area as the polarizing plate 1.

Furthermore, the non-formation region 10 is effective even if the protective film 4, 8, is formed on the substrate 2, 5 obtained by cutting into pieces in advance. That is, in the polarizing plate 1, a defect tends to occur near the circumferential edge part of the substrate 2, 5 due to disruption of the grid structure of the protective film 4, 8 or disruption of the substrate shape. Moreover, in the polarizing plate 1, there is a high possibility that a foreign substance is attached near the circumferential edge part at the time of handling the substrate 2, 5, and the degree of degradation to be given from even a slight defect to the polarizing film may be large depending on the type of the foreign substance and the type of the polarizing film. For this reason, with the non-formation region 10 where the grid G is not formed being provided near the circumferential edge part of the substrate 2, 5, the polarizing plate 1 has a large effect in improving reliability even without a cutting process after formation of the protective film 4, 8.

Figure 6:
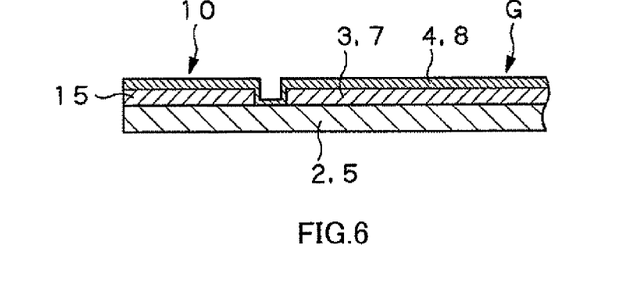
FIG. 6 is a sectional view of a circumferential edge part of the substrate.

Here, the non-formation region 10 means a region where a grid-shaped fine pattern (the grid G) is not formed, and includes the one as depicted in FIG. 6 in which a metal film 15 such as an Al film is exposed via the protective film 4, 8, as well as the one in which a flat surface of the substrate 2, 5 itself is directly exposed, and the one in which a flat film covering the front surface of the substrate 2, 5 is exposed.

Also, in the case of the polarizing plate 1A in which the grid G is formed of a metal material such as Al and a polarizing plate having a similar structure, the metal film 15 is left as it is in the non-formation region 10. In this case, the metal film in the non-formation region 10 functions as a reflective film or a light-shielding film in an optical sense, and the non-formation region 10 serves as a light-shielding part.

The non-formation region 10 is a region that does not function in a sense of polarization properties and, as the polarizing plate 1, if the effective region is desired to be increased, the non-formation region 10 is preferably small. Furthermore, when light passing through this non-effective portion becomes leak light to adversely affect the plate, a light-shielding film (such as a reflective film or an absorption film, which partially shields light) is preferably formed on this portion, and the metal film 15 fowled in the non-formation region 10 is suitable for this purpose. On the other hand, if the reflecting film adversely affect the plate, the light-shielding film can be removed by etching to have transparency.

Also, in the polarizing plate 1, the protective film 4, 8 is formed also on the non-formation region 10 on the circumferential edge part of the substrate 2, 5. If a protective film is formed on parts excluding the circumferential edge part of the substrate 2, 5 according to the region of the grid G where the wire grid 3 or the fine particles 7 arranged on the grid pattern 6 are formed, there is a possibility that protection capability of a circumferential edge portion of a formation region of the protective film becomes insufficient due to a decrease in film thickness. Therefore, the protective film is preferably formed larger than the formation region of the grid G and, furthermore, is preferably formed on the entire surface of the substrate including the substrate circumferential part.

And, in the polarizing plate 1, since the protective film 4, 8 is formed also on the non-formation region 10 on the circumferential edge part of the substrate 2, 5, protection capability of the wire grid 3 or the fine particles 7 arranged on the grid pattern 6 is improved. Also, a fault of the protective film 4, 8 on the circumferential edge part of the substrate 2, 5 does not overlap the formation region of the wire grid 3 or the fine particles arranged on the grid pattern 6, and does not affect this protection capability.

Figure 7:
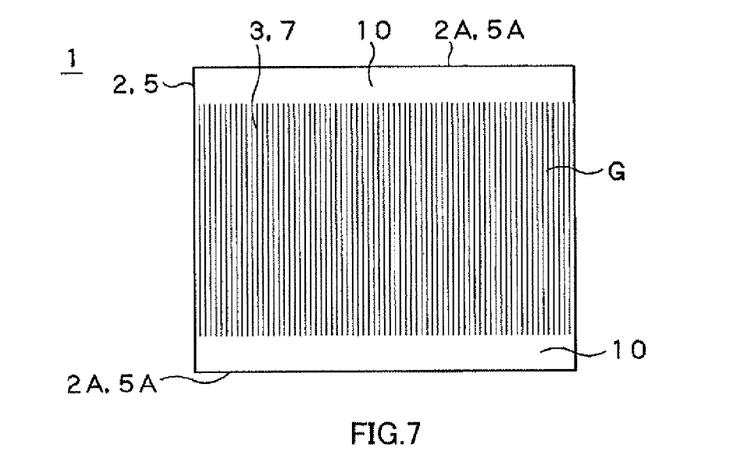
FIG. 7 is a plan view of another polarizing plate.
Figure 8:
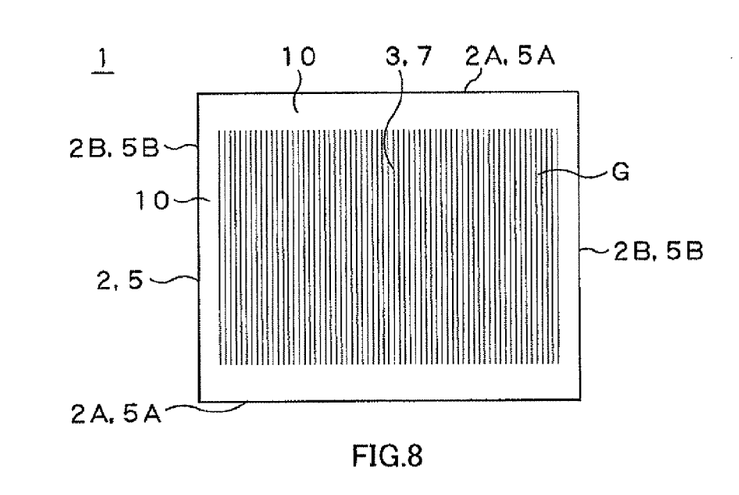
FIG. 8 is a plan view of still another polarizing plate.

Furthermore, the non-formation region 10 may be formed on the entire perimeter of the substrate 2, 5 as depicted in FIG. 3, may be formed only on sides 2A, 5A orthogonal to a direction of the wire grid 3 or a direction of arrangement of the fine particles 7 of the substrate 2, 5 as depicted in FIG. 7, or as depicted FIG. 8, the non-formation region 10 on the sides 2A, 5A orthogonal to the direction of the wire grid 3 or the direction of arrangement of the fine particles 7 of the substrate 2, 5 may be formed so as to be larger than sides 2B, 5B parallel to the direction of the wire grid 3 or the direction of arrangement of the fine particles 7.

Degradation of the polarizing plate tends to develop in a direction of the grid G along the wire grid 3 or the fine particles 7. Therefore, if a fracture of the protective film 4, 8 occurs on a cut end face orthogonal to the direction of the wire grid 3 or the direction of arrangement of the fine particles 7, compared with the case in which a fracture occurs in the protective film 4, 8 on a cut end face parallel to the direction of the wire grid 3 or the direction of arrangement of the fine particles 7, there is a high possibility that degradation of the polarizing film expands from the circumferential edge part of the substrate 2, 5 to the inside.

Therefore, by forming the non-formation region 10 only on the sides 2A, 5A orthogonal to the direction of the wire grid 3 or the direction of arrangement of the fine particles 7 or by increasing the size on the orthogonal sides 2A, 5A to be larger than the parallel sides 2B, 5B, while the effective region is being kept large in the polarizing plate 1 for the sides parallel to the direction of the wire grid 3 or the direction of arrangement of the fine particles 7, degradation of the polarizing film can be prevented from expanding inside to develop also on the effective region of the polarizing plate 1, thereby ensuring capability of the protective film.

Figure 9A:
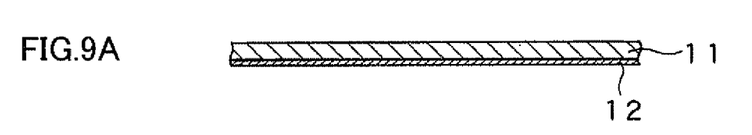
FIG. 9A to FIG. 9F are drawings of a process of producing the wire-grid polarizing plate.
Figure 9B:
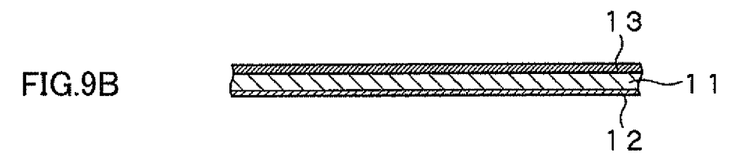
Figure 9C:
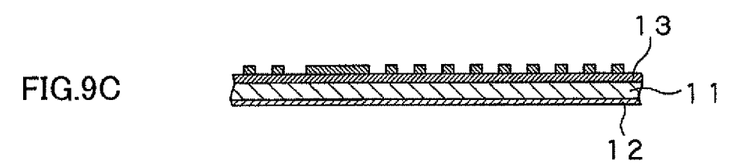

Next, a method of producing the wire-grid polarizing plate 1A is described with reference to FIG. 9. After a plurality of wire-grid polarizing plates 1A are formed on a wafer substrate 11, they are cut into pieces so as to each have a predetermined size for pieces. First, after an antireflection film (ARC) 12 is formed on a back surface of the wafer substrate 11 (FIG. 9A), an Al thin film 13 is formed on a front surface of the wafer substrate 11 by sputtering or the like (FIG. 9B). Next, an antireflection film (BARC) and a chemical-catalyst-type photoresist are applied in this order by a spin coater. Next, after two-beam interference exposure is performed by a DUV (deep ultraviolet ray) laser for development, a grid pattern of the resist having a predetermined pitch, width, and height is formed. Here, a rectangular light-shielding opening mask is provided on the front surface of the wafer substrate 11, and a region not to be exposed at the time of two-beam interference exposure is formed on a circumferential edge part formed on the wafer substrate 11 (FIG. 9C).

Figure 9D:
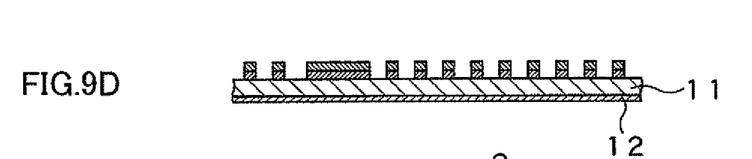
Figure 9E:
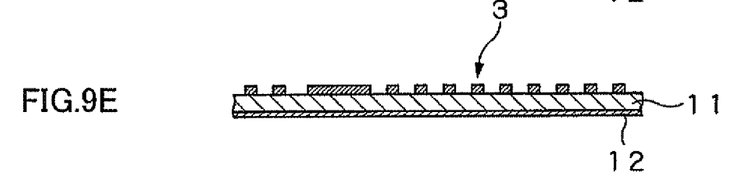

Next, to form a grid pattern of Al by RIE etching, Al etching by C14 gas is first performed (FIG. 9D), and then the residual resist is removed with Ar gas (FIG. 9E). With this, the wire grid 3 and the non-formation region 10 are formed on the circumferential edge part of each substrate 2. Note that while the Al thin film is left on the non-formation region 10 to be caused to function as a light-shielding part in FIG. 9E, a light-shielding part may not be provided by removing the Al thin film on the non-formation region 10 in the Al etching process.

Figure 9F:
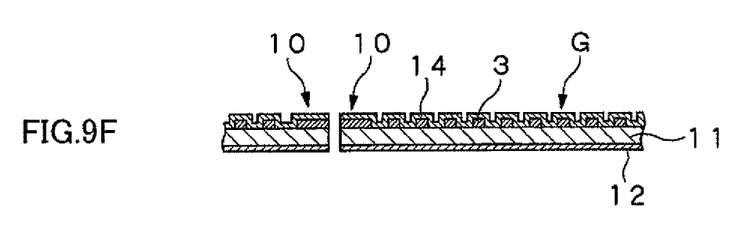

Next, a protective film 14 made of $SiO_2$ or the like is formed by chemical vapor deposition (CVD) or the like on the entire surface of the wafer substrate 11 (FIG. 9F). Finally, the wire-grid polarizing plates 1A formed on this wafer substrate 11 are cut out by a general-purpose glass scriber or the like into pieces so as to each have a predetermined size. Note that the wire-grid polarizing plates 1A may be cut out into pieces before the protective film 14 is formed and the protective film 14 may be formed last. Also, the wire-grid polarizing plate 1A may be formed by performing the process described above on each substrate 2 obtained by cutting into pieces in advance.

Figure 10A:
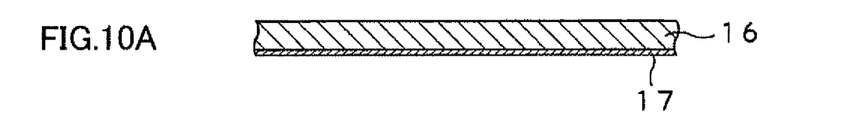
FIG. 10A to FIG. 10G are drawings of a process of producing the fine-particle-type polarizing plate.
Figure 10B:
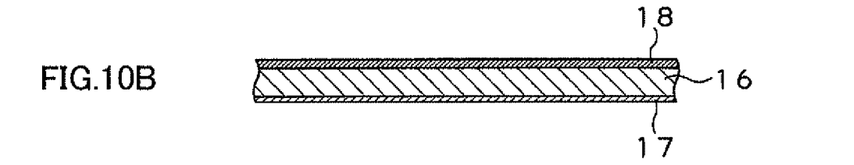
Figure 10C:
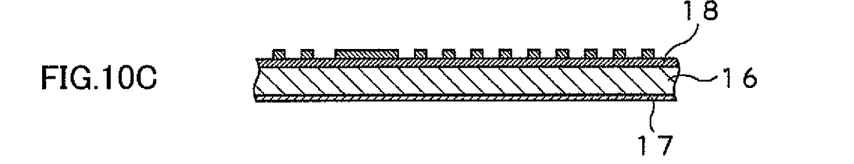

Next, a method of producing the fine-particle-type polarizing plate 1B is described with reference to FIG. 10. Similarly, after a plurality of fine-particle-type polarizing plates 1B are formed on a wafer substrate 16 formed of a quartz substrate or the like, they are cut into pieces so as to each have a predetermined size. First, after an antireflection film 17 is formed on a back surface of the wafer substrate 16 (FIG. 10A), an Al thin film 18 is formed on a front surface of the wafer substrate 16 by sputtering or the like (FIG. 10B). Next, an antireflection film and a chemical-catalyst-type photoresist are applied in this order by a spin coater. Next, after two-beam interference exposure is performed by a DUV laser for development, a grid pattern of the resist having a predetermined pitch, width, and height is formed. Here, a rectangular light-shielding opening mask is provided on the front surface of the wafer substrate 16, and a region not to be exposed at the time of two-beam interference exposure is formed on a circumferential edge part of each of the plurality of substrate 5 formed on the wafer substrate 16 (FIG. 10C).

Figure 10D:
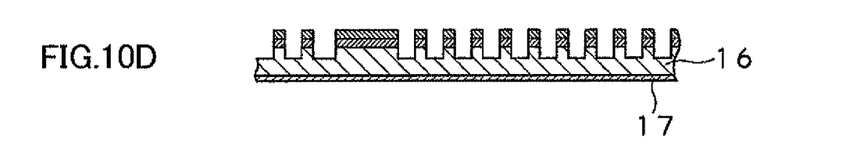
Figure 10E:
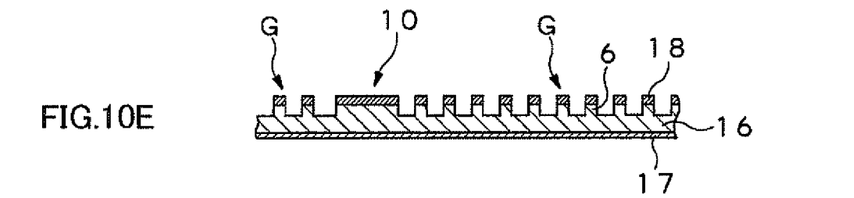
Figure 10F:
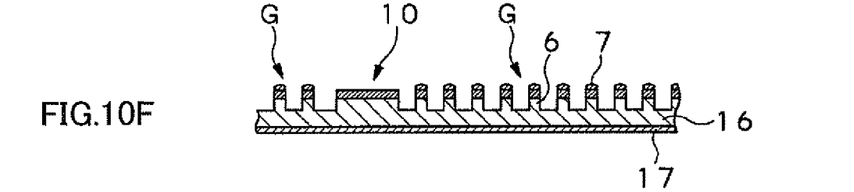

Then, after Al etching by $Cl_4$ gas is performed (FIG. 10D), the residual resist is removed with Ar gas (FIG. 10E). Here, the Al film is caused to partially function as an etching mask, resulting in formation of an uneven grid pattern 6 on the quartz substrate with a predetermined pitch. Also, the Al film is not necessarily required to be provided on the grid pattern 6, and the Al film may be removed as appropriate. On this substrate, the fine particles 7 made of Ge or the like are arranged and formed by sputtering (FIG. 10F). With this, the grid G and the non-formation region 10 are formed on the circumferential edge part of each substrate 5. Note that the Al thin film is left on the non-formation region 10 and is caused to function as a light-shielding part in FIG. 10E, a light-shielding part may not be provided by removing the Al thin film on the non-formation region 10 in the Al etching process.

Figure 10G:
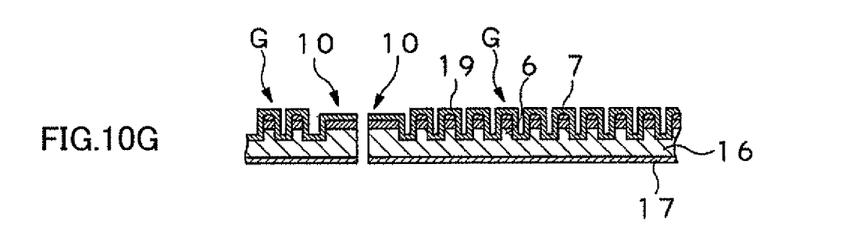

Next, a protective film 19 made of $SiO_2$ or the like is formed by chemical vapor deposition (CVD) or the like on the entire surface of the wafer substrate 16. Finally, the fine-particle-type polarizing plates 1B formed on this wafer substrate 16 are cut out into pieces of a predetermined size (FIG. 10G). Note that similarly, the fine-particle-type polarizing plates 1B may be cut out into pieces before the protective film 19 is formed and the protective film 19 may formed last. Also, the fine-particle-type polarizing plates 1B may be formed by performing the process described above on each substrate 5 obtained cutting into pieces in advance.

EXPERIMENT EXAMPLE 1

In Experiment Example 1, regarding the wire-grid polarizing plate 1A provided with the non-formation region 10, a wire-grid polarizing plate not provided with the non-formation region 10, and a wire-grid polarizing plate in which a protective film is not formed, changes of each polarizing film were observed.

In Experiment Example 1, an Al thin film of 230 nm is formed by a DC sputtering device on a front surface of a 4-inch quartz substrate having a back side where an antireflection film (ARC) is formed of a dielectric multi-layered film. Next, an antireflective film (BARC) having a thickness of 28 nm and a chemical-catalyst-type photoresist having a thickness of 230 nm are applied in this order by a spin coater. Next, after two-beam interference exposure is performed by a DUV (deep ultraviolet ray) laser for development, a grid pattern of the resist having a pitch of 150 nm, a width of 70 nm, and a height of 180 nm is formed. Next, to form a grid pattern of Al by RIE etching, Al etching by C14 gas was first performed, and then the residual resist was removed with Ar gas. Wire-grid polarizing plates formed on this 4-inch wafer was cut by a general-purpose glass scriber into pieces each having a size of 25 mm×25 mm, which was taken as Comparative Example 1.

A protective film made of $SiO_2$ and with a thickness on the order of 20 nm was formed by chemical vapor deposition (CVD) in Comparative Example 1, and the result was taken as Comparative Example 2. In the state of the 4-inch substrate before cutting, a protective film was formed with the same conditions and then the substrate was cut into pieces of 25 mm×25 mm each, which was taken as Comparative Example 3. Next, a rectangular light-shielding opening mask was provided on the front surface of the substrate at the time of interference exposure to form a region of 24.5 mm×24.5 mm with its outer side not exposed, and fabrication was made with the same conditions as those of Comparative Example 2 and Comparative Example 3 except the provision of the non-formation region 10, which were taken as Example 1 and Example 2, respectively. Ten plates of each of these completed wire-grid polarizing plates of five types were left for hundred hours in an environment with a temperature of 60° C. and a humidity of 90%, and changes of the polarizing plates were observed.

TABLE 1

|  | Formation of protective film | Non-formation region | Discoloration occurred after humidity-resistance test | Discoloration did not occur after humidity-test resistance | Remarks |
| --- | --- | --- | --- | --- | --- |
| Comparative example 1 | None | None | 10 samples | 0 sample | Polarization unevenness on entire surface |
| Comparative example 2 | After cutting | None | 1 sample | 9 samples | striped discolored region from end face of side orthogonal to grid |
| Comparative example 3 | Before cutting | None | 3 samples | 7 samples | Striped discolored region from end face of side orthogonal to grid |
| Example 1 | After cutting | Present | 0 sample | 10 samples | |
| Example 2 | Before cutting | Present | 0 sample | 10 samples | |

The results are shown in Table 1. In Comparative Example 1 in which a protective film was not formed, faint unevenness of the polarizing film thought to be caused by alteration such as Al surface oxidation occurred on the entire surface of the substrate in all samples.

In Comparative Example 2 in which a protective film was formed after cutting the substrate but the non-formation region 10 was not provided on the circumferential edge part of the substrate and the wire grid was formed also on the circumferential edge part of the substrate obtained by cutting into pieces, discoloration or degradation in properties at the center of the substrate were not present, but there was a sample in which a striped discolored region extending from the perimeter to the center of the substrate was observed. In Comparative Example 3 in which the non-formation region 10 was not provided on the circumferential edge part of the substrate and the wire grid was formed also on the circumferential edge part of the substrate and also the substrate was cut into pieces after a protective film was formed, the number of samples in which a discolored region was observed was larger than that of Comparative Example 2. In evaluation of polarization properties of the discolored region for Comparative Example 2 and Comparative Example 3, degradation in polarization properties was observed such that part of polarizing components supposed to be reflected passed through.

On the other hand, in contrast to these Comparative Example 2 and Comparative Example 3, in Example 1 and Example 2 in which a protective film was present and the non-formation region 10 was provided on the circumferential edge part of the substrate, irrespectively of formation of the protective film was before or after cutting of the substrate, no discolored region or the like was not observed over the entire surface including the substrate center and the substrate circumferential edge part in all samples.

EXPERIMENT EXAMPLE 2

In Experiment Example 2, regarding the fine-particle-type polarizing plate 1B provided with the non-formation region 10, a fine-particle-type polarizing plate not provided with the non-formation region, and a fine-particle-type polarizing plate in which a protective film is not formed, changes of each polarizing film were observed.

In Experiment Example 2, an Al thin film of 60 nm is formed by sputtering on a front surface of a quartz substrate of a 25 mm square having a back side where an antireflection film (ARC) is formed of a dielectric multi-layered film. Next, an antireflective film (BARC) having a thickness of 28 nm and a chemical-catalyst-type photoresist having a thickness of 230 nm are applied in this order by a spin coater. Next, after two-beam interference exposure is performed by a DUV (deep ultraviolet ray) laser for development, a grid pattern of the resist having a pitch of 150 nm, a width of 70 nm, and a height of 230 nm is formed. Then, after Al etching by C14 gas was performed, the residual resist was removed with Ar gas. Here, the Al film is caused to partially function as an etching mask, resulting in formation of an uneven grid pattern on the quartz substrate with a pitch of 150 nm. By arranging and forming Ge fine particles on this substrate by sputtering, Comparative Example 4 of the fine-particle-type polarizing plate was obtained. Next, a protective film made of $SiO_2$ and with a thickness on the order of 20 nm was formed by chemical vapor deposition (CVD) in Comparative Example 4, and the result was taken as Comparative Example 5.

Also, a light-shielding mask was provided on the entire surface of the substrate at the time of interference exposure to form a region on the order of 1 mm from an end only in a direction orthogonal to the grid, and fabrication was made with the same conditions as those of Comparative Example 5 except the provision of the non-formation region 10, which was taken as Example 3. Ten plates of each of these completed fine-particle-type polarizing plates of three types were prepared with sebum artificially attached on circumferential four surfaces of the substrate as an extreme example occurring at the time of handling and were left for hundred hours in an environment with a temperature of 60° C. and a humidity of 90%, and changes of the polarizing plates were observed.

TABLE 2

| | Formation of protective film | Non-formation region | Discoloration occurred after humidity-resistance test | Discoloration did not occur after humidity-resistance test | Remarks |
|---|---|---|---|---|---|
| Comparative example 4 | None | None | 10 samples | 0 sample | Entire surface became transparent |
| Comparative example 5 | Present | None | 2 samples | 8 samples | Striped Discolored region from end face of side orthogonal to grid |
| Example 3 | Present | Present | 0 sample | 10 samples | |

The results are shown in Table 2. In Comparative Example 4 in which a protective film was not formed, oxidation of Ge occurred on the entire surface of the substrate and the polarizing film became completely transparent in all samples. In Comparative Example 5 in which a protective film was formed but the non-formation region 10 was not provided and the grid was formed also on the circumferential portion of the substrate, discoloration or degradation in properties at the center of the substrate was not present, but there was a sample in which a striped discolored region extending from the perimeter to the center of the substrate was observed. In evaluation of polarization properties of the discolored region, degradation in polarization properties was observed such that part of polarizing components supposed to be reflected passed through.

On the other hand, in Example 3 in which a protective film was present and the non-formation region 10 was provided near a side orthogonal to the grid pattern in Comparative Example 5, no discolored region or dropouts occurred.

In Comparative Example 5, there is no cutting process after formation of the protective film. It is thus thought that this degradation is not caused by partial fracture of the protective film due to cutting and some alteration of the polarizing film is induced by sebum from a defective part of the protective film that is present at a substrate end and develops along the grid pattern. From the results of Example 3, it is thought that, in the non-formation region 10 where a grid pattern is not formed, degradation does not develop along the grid pattern irrespectively of this defect of the protective film and therefore a sufficient protective function is kept.

As such, in the wire-grid polarizing plate and the fine-particle-type polarizing plate each provided with the non-formation region 10 where a grid is not formed near the substrate end, it has been verified that degradation of the polarizing film does not occur and each polarizing plate has excellent reliability in a high-humidity test.

INDUSTRIAL APPLICABILITY

The present invention is not restricted to the wire-grid polarizing plate 1A and the fine-particle-type polarizing plate 1B, and can be applied to any device, for example, a wave plate, as long as the device has a fine grid and a structure similar to the grid and depends on polarization. In this case, as the fine grid, a structure having a pitch approximately smaller than ½ of the use wavelength and an uneven section can be mainly assumed. While the sectional shape of the grid can be determined as appropriate within a range having desired polarization properties, "unevenness depth/pitch" equal to or larger than ½ is suitable because excellent polarization properties are produced.

REFERENCE SIGNS LIST

1 . . . polarizing plate, 1A . . . wire-grid polarizing plate, 1B . . . fine-particle-type polarizing plate, 2 . . . substrate, 3 . . . wire grid, 4 . . . protective film, 5 . . . substrate, 6 . . . grid pattern, 7 . . . fine particles, 8 . . . protective film, 9 . . . antireflection film, 10 . . . non-formation region, 11 . . . wafer substrate, 12 . . . antireflection film, 13 . . . Al thin film, 14 . . . protective film, 16 . . . wafer substrate, 17 . . . antireflection film, 18 . . . Al thin film, 19 . . . grid pattern, 20 Ge fine particles, 21 . . . protective film

The invention claimed is:

1. A polarizing plate in which a substrate has a grid, a non-formation region where the grid is not formed, and
   a protective film protecting the grid is formed on an entire surface of the grid and is formed also on the non-formation region,
   wherein the non-formation region is formed on an entire perimeter of the substrate or only on sides orthogonal to a longitudinal direction of the grid.

2. The polarizing plate according to claim 1, wherein the protective film is made of a transparent material.

3. The polarizing plate according to claim 1, wherein a light-shielding part is formed in the non-formation region.

4. The polarizing plate according to claim 1, wherein the non-formation region extends 0.2 mm or more from a circumferential edge part of the substrate toward an inside of the substrate.

5. The polarizing plate according to claim 4, wherein the non-formation region is provided at a position 2 to 3 mm from the circumferential edge part of the substrate.

6. The polarizing plate according to claim 1, wherein the substrate is formed in a substantially rectangular shape, and
   the non-formation region is provided on a circumferential edge part of the sides substantially orthogonal to the longitudinal direction of the grid of the substrate.

7. The polarizing plate according to claim 6, wherein the non-formation region is further provided on a circumferential edge part of a side substantially parallel to the longitudinal direction of the grid of the substrate.

8. The polarizing plate according to claim 7, wherein the non-formation region provided on the circumferential edge part of the side substantially orthogonal to the longitudinal direction of the grid in the substrate is formed so as to be larger than the non-formation region provided on the circumferential edge part of the side substantially parallel to the longitudinal direction of the grid.

9. The polarizing plate according to claim 1, wherein the protective film for protecting the grid contacts an entire concave/convex surface of the grid including portions of the substrate disposed between lines of the grid.

10. A method of producing a polarizing plate, comprising:
a step of providing, on a ground film formed on an entire surface of a substrate, a resist having a pattern for forming a grid and a pattern for forming a non-formation region, in which the grid is not formed, on a circumferential edge part of the substrate, and forming the grid and the non-formation region by using the ground film; and
a step of forming a protective film for protecting the grid, the protective film for protecting the grid being formed on an entire surface of the grid and being formed also on the non-formation region,
wherein the non-formation region is formed on an entire perimeter of the substrate or only on sides orthogonal to a longitudinal direction of the grid.

11. The polarizing plate producing method according to claim 10, comprising a step of cutting a plurality of the polarizing plates formed on a wafer substrate.

12. The polarizing plate producing method according to claim 11, wherein
the cutting step is performed before the step of forming the protective film.

13. The polarizing plate producing method according to claim 11, wherein
the cutting step is performed after the step of forming the protective film.

14. The polarizing plate producing method according to claim 10, wherein
the protective film is made of a translucent material.

15. The polarizing plate producing method according to claim 10, wherein
a light-shielding part is formed in the non-formation region.

16. The polarizing plate producing method according to claim 10, wherein
the non-formation region extends 0.2 mm or more from the circumferential edge part of the substrate toward an inside of the substrate.

17. The polarizing plate producing method according to claim 16, wherein
the non-formation region is provided at a position 2 to 3 mm from the circumferential edge part of the substrate.

18. The polarizing plate producing method according to claim 10, wherein
the substrate is formed in a substantially rectangular shape, and
the non-formation region is provided on the circumferential edge part of the sides substantially orthogonal to the longitudinal direction of the grid of the substrate.

19. The polarizing plate producing method according to claim 18, wherein
the non-formation region is further provided on a circumferential edge part of a side substantially parallel to the longitudinal direction of the grid of the substrate.

20. The polarizing plate producing method according to claim 19, wherein
the non-formation region provided on the circumferential edge part of the side substantially orthogonal to the longitudinal direction of the grid in the substrate is formed so as to be larger than the non-formation region provided on the circumferential edge part of the side substantially parallel to the longitudinal direction of the grid.

* * * * *